(12) United States Patent
Gottschlag et al.

(10) Patent No.: US 9,883,092 B2
(45) Date of Patent: Jan. 30, 2018

(54) MOBILE RECEIVER UNIT, METHOD FOR OPERATING THE MOBILE RECEIVER UNIT AND COMPUTER PROGRAM

(71) Applicant: Robert Bosch GmbH, Stuttgart (DE)

(72) Inventors: Daniel Gottschlag, Nuremberg (DE); Stephan Heigl, Hannover (DE); Michael Yanni, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 14/429,385

(22) PCT Filed: Sep. 16, 2013

(86) PCT No.: PCT/EP2013/069150
§ 371 (c)(1),
(2) Date: Mar. 19, 2015

(87) PCT Pub. No.: WO2014/044636
PCT Pub. Date: Mar. 27, 2014

(65) Prior Publication Data
US 2015/0229827 A1     Aug. 13, 2015

(30) Foreign Application Priority Data

Sep. 24, 2012    (DE) .................. 10 2012 217 146

(51) Int. Cl.
*H04N 5/232*     (2006.01)
*H04N 7/18*      (2006.01)

(52) U.S. Cl.
CPC ..... *H04N 5/23206* (2013.01); *H04N 5/23293* (2013.01); *H04N 7/183* (2013.01)

(58) Field of Classification Search
CPC combination set(s) only.
See application file for complete search history.

(56) References Cited

U.S. PATENT DOCUMENTS

| 5,902,968 A * | 5/1999 | Sato ................ G06F 3/03545 178/19.01 |
| 2009/0237202 A1* | 9/2009 | Mullet ............... G07C 9/00182 340/5.7 |

(Continued)

FOREIGN PATENT DOCUMENTS

| DE | 102006033147 | 1/2008 |
| DE | 102010006982 | 8/2011 |

(Continued)

OTHER PUBLICATIONS

International Search Report for Application No. PCT/EP2013/069150 dated Dec. 4, 2013 (English Translation, 3 pages).

*Primary Examiner* — Sath V Perungavoor
*Assistant Examiner* — Janese Duley
(74) *Attorney, Agent, or Firm* — Michael Best & Friedrich LLP (57) ABSTRACT

The invention relates to a mobile receiver unit (1) for controlling an actuator (2) for setting a pan and/or tilt angle α, β of a camera (3), said unit having a display device 4 to display an image captured by the camera (3), a control device (5) to define control commands for the actuator (2) and a transmitter unit (6) to transmit the control commands to the actuator (2), wherein the control device (5) has a gyroscopic sensor (7) to detect a relative change in angle of the mobile receiver unit (1) around at least one axis A, B, wherein a control command for a relative angle change of the pan angle α and/or the tilt angle β of the camera (3) is determined by the relative angle change, and/or the control device (5) has a compass sensor (8) to detect an absolute angle position of the mobile receiver unit (1) around at least one axis A, B, wherein a control command for an absolute angle setting of the pan angle α of the camera is determined by the absolute angle position.

11 Claims, 7 Drawing Sheets

(56) References Cited

U.S. PATENT DOCUMENTS

2012/0038549 A1    2/2012   Mandella et al.
2012/0127319 A1*  5/2012   Rao .................... H04N 5/23206
                                                    348/169

FOREIGN PATENT DOCUMENTS

| EP | 1773045 | | 4/2007 |
| --- | --- | --- | --- |
| JP | 2004128997 A | * | 4/2004 |
| KR | 1020100124906 | | 11/2010 |

* cited by examiner

MOBILE RECEIVER UNIT, METHOD FOR OPERATING THE MOBILE RECEIVER UNIT AND COMPUTER PROGRAM

BACKGROUND OF THE INVENTION

The invention relates to a mobile receiver unit for controlling an actuator for setting a pan and/or tilt angle of a camera, said unit having a display device to display an image captured by the camera, a control device to define the control commands for the actuator and a transmitter unit to transmit the control commands to the actuator. The invention also relates to a method for operating the mobile receiver unit as well as to a computer program.

Pan/tilt cameras are used to monitor public or private buildings or open public spaces, streets, stations, factories etc. Such cameras can be adjusted for pan and tilt and can therefore be directed onto the desired monitoring region. The control of the pan/tilt camera takes place by means of a joystick. The image data captured by the pan/tilt camera are transmitted to a display screen for viewing.

The Korean patent application KR 207 012 49 06 A, which arguably represents the closest prior art, describes a system device for controlling a PTZ camera. The system device comprises a mobile unit comprising an acceleration sensor and a contact sensor. The PTZ camera is controlled by means of the acceleration data captured by the acceleration sensor and the contact data captured by the contact sensor.

SUMMARY OF THE INVENTION

The invention relates to a mobile receiver unit for controlling an actuator for setting a pan and/or tilt angle of a camera. The pan angle of the camera extends about a pan axis, in particular an axis that runs vertically. The tilt angle of the camera extends about a tilt axis, in particular an axis that runs horizontally, which is aligned perpendicularly to the viewing direction of the camera. The camera therefore has at least one, however preferably exactly two, rotatory degrees of freedom as a result of the pan axis and/or tilt axis. When the pan and/or tilt angle of the camera is changed about the pan and/or tilt axis, the viewing direction of the camera changes. In this way, different areas of, e.g., a space or a monitoring region can be captured by the camera.

The actuator is controlled by means of a manual operation of the mobile receiver unit. The mobile receiver unit is particularly designed to be portable for a user and/or to be used independently of location. The camera can preferably be panned by means of the actuator about the pan axis at a pan angle of 0°-360°. As an alternative or an additional option, the camera can be tilted by means of the actuator about the tilt axis, e.g., at a tilt angle of 0°-180°, in particular at a tilt angle of 0°-90°. The actuator relates, e.g., to a stepping motor, however preferably to a servomotor.

The mobile receiver unit comprises a display device to display the image captured by the camera. In a particularly preferred manner, the mobile receiver unit is designed to display a current image or real time image of the camera. The display device is particularly designed as a display screen.

The mobile receiver unit comprises a control device to define control commands for the actuator. The control commands are defined particularly by capturing a command input of the user for the desired setting of the pan and/or tilt angle of the camera.

The mobile receiver unit comprises a transmitter unit to transmit the control commands to the actuator. The actuator is designed to carry out the control commands. The command input of the user for setting the pan and/or tilt angle is therefore implemented. As a result, the viewing direction of the camera desired by the user for capturing the desired image is set.

It is proposed within the scope of the invention that the control device has a gyroscopic sensor to detect a relative change in angle of the mobile receiver unit around at least one axis, wherein a control command for a relative angle change of the pan angle and/or the tilt angle of the camera is determined by the relative angle change. The relative change in angle of the mobile receiver unit therefore constitutes the command input of the user. The relative change in angle relates to a rotatory movement of the mobile receiver unit around the at least one axis. The relative change in angle of the mobile receiver unit takes place from an original state into a target state, wherein the difference from the original state into the target state around the at least one axis specifies the relative change in angle of the camera from an original setting into a target setting preferably around the pan and/or tilt axis. As a result of the relative angle change of the camera, the camera is consequently moved into the desired viewing direction of the user.

The gyroscopic sensor measures particularly the angular velocity of the mobile receiver unit along the at least one axis, wherein the relative change in angle of the mobile receiver around the at least one axis is determined using the measured angular velocity. The relative change in angle of the mobile receiver can, e.g., be derived by integrating the measured angular velocity. The gyroscopic sensor is, for example, designed as a yaw-rate sensor.

As an alternative or an optional addition, the control device comprises a compass sensor to detect an absolute angle position of the mobile receiver unit around at least one axis, wherein a control command for an absolute angle setting of the pan angle is determined by the absolute angle position. An amount of the absolute angle position of the pan angle is therefore always associated with an amount of the absolute angle position set by the user. The absolute angle position corresponds to the current alignment position of the mobile receiver unit in one direction. The absolute angle position can, for example, be subdivided into north, east, south, west or north, north/east, south/east, south, south/west, west, north/west or also in degree measurements from 0°-360°, wherein 0° is associated with north, 90° with east, 180° with south and 270° with west.

The relative change in angle and/or the absolute angle position of the mobile receiver unit allows the user to directly actuate the actuator. Additional auxiliary elements, such as, e.g., a joystick for the command input, can be avoided in this way. A compact embodiment is therefore implemented in conjunction with a simultaneously clearly arranged and intuitive operation of the mobile receiver unit. In addition, mobile receiver units of today's standards generally comprise gyroscopic and/or compass sensors, so that no additional costs accrue for the detection of the relative change in angle and/or the absolute angle position of the mobile receiver unit.

In a preferred embodiment, the gyroscopic sensor and/or the compass sensor can be switched on and off by the user. Preferably an operating device is used to switch said sensor(s) on and off. The operating device is, for example, embodied as a mouse, keyboard; however, preferably as a touchscreen integrated into the display device. If the mobile receiver unit comprises the gyroscopic sensor as well as the compass sensor, provision is preferably made for said sensors to be able to be switched on and off independently of one another. In this way, the user can determine if a relative change in the angle of the mobile receiver unit and/or an absolute angle position of said mobile receiver unit is to be detected. The user can thus individually perform the setting of the camera according to his/her wishes. It is alternatively possible for the gyroscopic sensor and the compass sensor to be switched on and off in combination. It is however likewise within the scope of the invention for the gyroscopic sensor and/or the compass sensor to be automatically switched on upon switching on the mobile receiver unit and/or a computer program.

Provision is preferably made for the gyroscopic sensor, the mobile receiver unit or, respectively, the computer program to be switched on, activated or reset always from the original state of the mobile receiver unit, wherein the original state is defined by a relative position of the mobile receiver unit. For example, the original state is defined as a horizontal position of said mobile receiver unit. The defined original position enables the relative change in the angle of the mobile receiver unit to always be detected on the basis of a defined relative position of said mobile receiver unit.

With regard to the gyroscopic sensor, provision is preferably made for the relative change in angle of the mobile receiver unit to be detected around a pan axis as the axis from the original state into a pan state and/or around a tilt axis as the axis from the original state into a tilt state. The pan state and/or the tilt state form the target state of the mobile receiver unit. In particular, the pan axis of the mobile receiver unit is associated with the pan axis of the camera and the tilt axis of the mobile receiver unit with the tilt axis of the camera. The control command for the relative change in angle of the pan angle of the camera is determined by the relative change in angle of the mobile receiver unit around the pan axis, and/or the control command for the relative change in angle of the tilt angle of the camera is determined by the relative change in angle of the mobile receiver unit around the tilt axis.

Provision is made in a preferred implementation of the invention for the pan axis to be defined as a vertically running axis and the tilt axis as a horizontally running axis. The vertically running axis as the pan axis extends in the plumb line direction. The vertically running axis is particularly defined as an absolute axis. The pan axis is therefore always, i.e. also in tilt state of the mobile receiver unit, runs in the plumb line direction. Provision is particularly made for the pan axis and the tilt axis to be orthogonal. The horizontally running tilt axis is, e.g., oriented along the mobile receiver unit in such a manner that, when viewed in the direct line of sight of the user onto the display device, the mobile receiver unit is tilted away from and towards the user during a tilting motion about the tilt axis. As an exemplary alternative, the horizontally running tilt axis is oriented along the mobile receiver unit in such a manner that, when viewed in the direct line of sight of the user onto the display device, the mobile receiver unit is tilted towards the left and right during a tilting motion about the tilt axis.

The pan axis is, for example, preferably formed by the user's own axis or an axis parallel thereto which runs through the mobile receiver unit, so that a relative change in angle of the mobile receiver unit around the pan axis occurs when the user rotates around his or her own axis. Provision is alternatively made for the pan axis to be configured as a rotational axis of the mobile receiver unit, wherein the rotational axis extends as a perpendicular to the display screen surface of the display device. The mobile receiver unit is therefore panned around the rotational axis thereof.

In a particularly preferred manner, the amount of the relative angle change of the pan angle and/or the tilt angle of the camera is equivalent to, in particular equal to, the amount of the relative change in angle of the mobile receiver unit around the at least one axis. The angle change of the camera is therefore linearly proportional to the relative change in angle of the mobile receiver unit. As a result of the equivalent amount of angle change as the camera, the mobile receiver unit forms a virtual window for the user because the amount of angle change from the original state into the pan and/or tilt state of the mobile receiver unit corresponds to the amount that the direction of view of the camera has changed around the pan and/or tilt angle. Hence, the camera implements analogous movements to those movements of the mobile receiver unit carried out by the user. In this way, a simple and readily understandable manipulation of the mobile receiver unit for setting the pan and or tilt angle of the camera is implemented.

With regard to the structural design, it is preferred that the gyroscopic sensor system comprises a first and a second gyroscopic sensor. Provision is thereby particularly made for the first gyroscopic sensor to be associated with the pan axis and the second gyroscopic sensor with the tilt axis. In this way, the relative change in angle of the mobile receiver unit can be detected around the pan axis as well as around the tilt axis. As an optional addition, the gyroscopic sensor system can comprise a third gyroscopic sensor, by means of which a third rotational movement of the mobile receiver unit is detected around an axis.

Provision is made in a preferred modification to the invention, for the relative change in angle of the mobile receiver unit around the pan axis of 0°-360° to correspond to an equivalent setting of the pan angle of 0°-360°.

Provision is made in a further preferred modification to the invention for the relative change in angle of the mobile receiver unit around the tilt axis of 0°-180° to correspond to an equivalent setting of the tilt angle of 0°-180°.

As an alternative to the equivalent relative change in angle of the pan angle and/or the tilt angle of the camera with respect to the relative change in angle of the mobile receiver around the at least one axis, it is possible for the relative change in angle of the receiver unit around the at least one axis to be scaled to the relative angle change of the pan angle and/or the tilt angle. The scaling can, for example, be defined by means of a look-up table. The less scaled change in angle of the mobile receiver unit around pan axis and/or tilt axis makes it possible to utilize the complete pan angle and/or tilt angle of the camera in the case of a minimal pan movement and/or tilt movement. A simple manipulation of the mobile receiver unit for controlling the actuator is thus implemented.

Provision is made in a preferred modification to the scaling for the relative change in angle of the mobile receiver unit around the pan axis of 0°-180°, in particular of 0°-90°, specifically of 0°-45°, to correspond to a setting of the tilt angle of 0°-360°.

Provision is made in a further preferred modification to the scaling for the relative change in angle of the mobile receiver unit around the tilt axis of 0°-90°, in particular of 0°-45°, specifically of 0°-30°, to correspond to a setting of the tilt angle of 0°-180°.

With regard to the compass sensor, it is preferred that the amount to which the absolute angle of the pan angle is set be equivalent to the amount of the absolute angle position of the mobile receiver unit or correspond to said angle position on a world coordinate system. The camera and the mobile receiver unit therefore always point in the same direction.

By defining the absolute direction of view of the camera, an orientation aid is advantageously achieved for the user.

Provision is made according to a preferred modification to the invention for the absolute angle position to be displayed on the display device. The user is thus informed, in which direction the camera is currently oriented. As a result, it is possible for the user to define in which direction the camera is to be oriented. As an alternative or an optional addition thereto, a plurality of directions, such as, e.g., north, east, south and west, is displayed on the display device in order to facilitate the desired orientation of the camera for the user.

If the control device comprises the gyroscopic sensor and the compass sensor, provision is, e.g., made for the relative angle change around the tilt axis to be detected in order to set the tilt angle of the camera and for the absolute angle position to be detected in order to set the pan angle of the camera.

In order to set the pan angle of the camera, it is alternatively possible for the absolute angle setting of the pan angle to take place in a first step and for the relative angle change of the pan angle to take place in a second step and in each further step. Hence, the absolute angle position is detected in the first step with the aid of the compass sensor, wherein the original state of the mobile receiver unit is equated with the absolute angle position. In the second and in each further step, the relative change in angle of the mobile receiver unit about the pan axis is detected with the aid of the gyroscopic sensor. As a result of the original state of the mobile receiver unit being equated with the detected absolute angle position, the target state always corresponds to the absolute angle position when a relative change in angle of said mobile receiver unit takes place. The equating of the absolute angle position with the original state and an equivalent amount of angle change of the mobile receiver unit and the camera always advantageously achieve a congruence between the direction of the receiving unit and that of the camera.

On the other hand, it is possible for the relative angle change about the pan axis to be detected parallel to the absolute angle position. The relative angle change and the absolute angle position are preferably correlated with one another in order to achieve a precise evaluation of the aligned mobile receiver unit and consequently a precise setting of the pan angle of the camera.

In a possible design implementation of the invention, the receiver unit comprises an operating device, wherein a zoom of the image captured by the camera or a zoom of the camera can be controlled by means of the operating device. The operating device is, for example, designed as a mouse; however, preferably as a touchscreen, which is, e.g., integrated into the display device.

In a preferred embodiment of the invention, at least or exactly one, two, three or a plurality of cameras is/are associated with the mobile receiver unit. This configuration has the advantage of being able to monitor a plurality of rooms or something similar. If at least two cameras are associated with the mobile receiver unit, it is preferably possible to switch to one of the cameras. A clear depiction of the image captured by the selected camera on the display device is therefore achieved.

Provision is made in a preferred design implementation of the invention for the mobile receiver unit to be designed as a tablet or as a mobile telephone. Tablets and mobile telephones can for the most part be intuitively operated by a user and therefore facilitate the command input for setting the pan and/or tilt angle of the camera. The control commands are, in particular, transmitted to an Internet portal or to a public telephone network.

A combination of the mobile receiver unit, the actuator as well as the camera can form a subject matter of the invention.

A method for operating a mobile receiver unit, preferably according to the preceding description, relates to a further subject matter of the invention. The pan and/or tilt angle of the camera changes when a change in angle of the mobile receiver unit around the at least one axis takes place. As an alternative or an optional addition, the absolute angle setting of the pan angle changes when the absolute angle position of the mobile receiver unit is changed.

A computer program comprising program code means relates to a further subject matter of the invention in order to carry out all of the steps of the aforementioned method if the program is executed on a computer and/or in the mobile receiver unit.

BRIEF DESCRIPTION OF THE DRAWINGS

Further features, advantages and effects of the invention ensue from the following description of preferred exemplary embodiments of the invention.

In the drawings.

DETAILED DESCRIPTION

Figure 1:
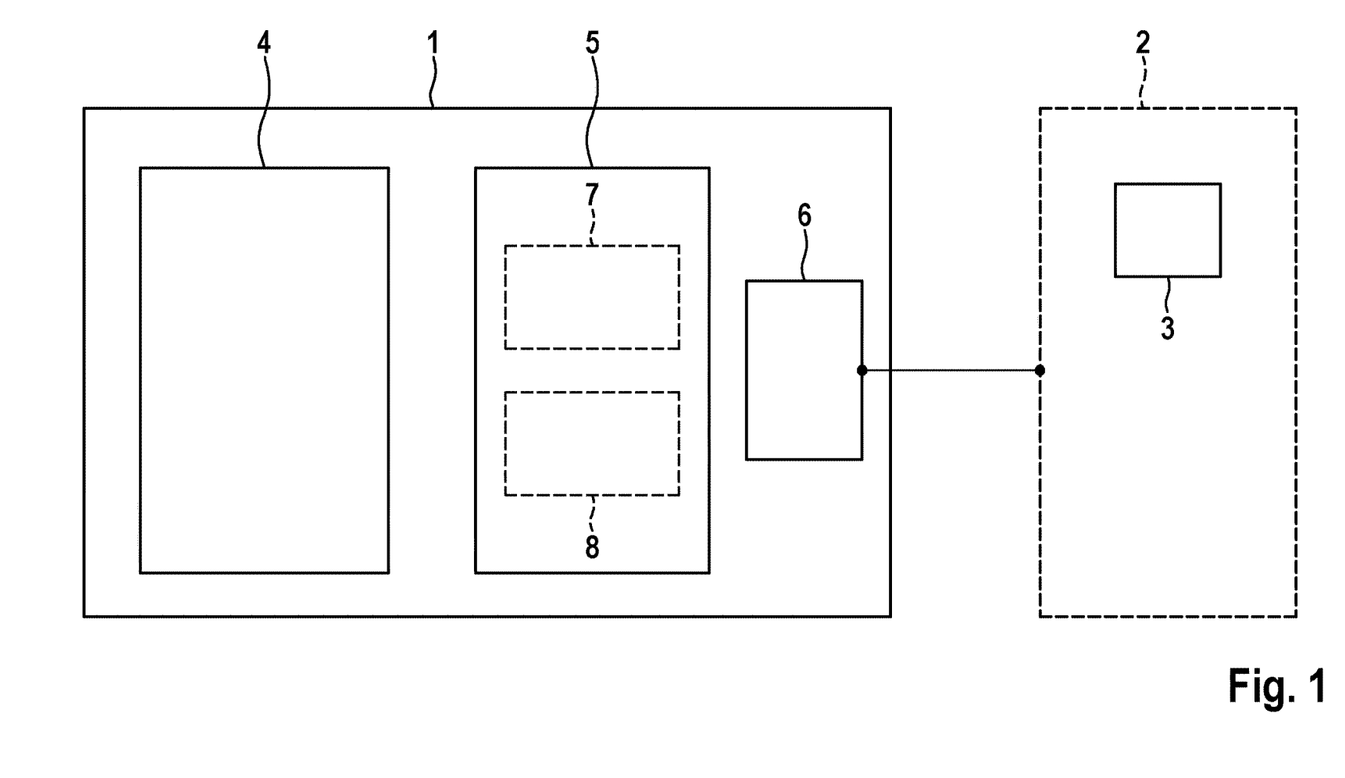
FIG. 1 shows the basic design of an inventive mobile receiver unit comprising a gyroscopic sensor and/or a compass sensor in a block diagram.

FIG. 1 shows the basic design of a mobile receiver unit 1 in a block diagram. The mobile receiver unit 1 relates, e.g., to a tablet or a mobile telephone. The mobile receiver unit 1 is designed to actuate an actuator 2. A camera 3 (not depicted here) is disposed on the actuator 2, wherein a pan and/or tilt angle α, β of the camera 3 is set by means of the control of the actuator 2. The pan angle α relates to a panning around a pan axis P, and the tilt angle β relates to a tilting of the camera around a tilt axis T (see FIGS. 2-4). It is, e.g., possible to pan the camera 3 around a pan axis P from 0°-360° and/or it is possible to tilt the camera 3 around the tilt axis T from 0° to 180°. The setting of the pan and/or tilt angle α, β allows the viewing direction of the camera 3 to be changed; thus enabling different spatial areas of a room or something similar to be detected by the camera 3.

The mobile receiver unit 1 comprises a display device 4 for displaying the image captured by the camera 3. The display device 4 is, e.g., designed as a display screen surface comprising an integrated touchscreen.

The mobile receiver unit 1 comprises a control device 5 to define control commands for the actuator 2. The control commands relate to evaluated command inputs of a user 9 (not depicted here) for setting the pan and or tilt angle α, β of the camera 3. The control commands are transmitted by a transmitter unit 6 to the actuator 2, whereupon the actuator 2 executes the control commands.

The control device 7 comprises a gyroscopic sensor 7 and/or a compass sensor 8. The control commands for setting the pan and/or tilt angle α, β are determined by means of the gyroscopic sensor 7 and/or the compass sensor 8.

A relative change in angle of the mobile receiver unit 1 around at least one axis A, B (see FIGS. 2-4) is detected by means of the gyroscopic sensor 7, wherein a control command for a relative angle change of the pan angle α and/or the tilt angle β of the camera 3 is determined by the relative angle change. The mobile receiver unit 1 is moved around the at least one axis A, B from an original state into a target state when the relative angle change occurs.

An absolute angle position of the mobile receiver unit 1 around the at least one axis A is detected by means of the compass sensor 8, wherein a control command for an absolute angle setting of the pan angle α of the camera 3 is determined by the absolute angle position. The absolute angle position corresponds to the current alignment position of the mobile receiver unit 1.

The setting of the pan and/or tilt angle α, β via the gyroscopic and/or compass sensor is explained in detail with the aid of the exemplary embodiments of FIGS. 2a-4.

Figure 2A:
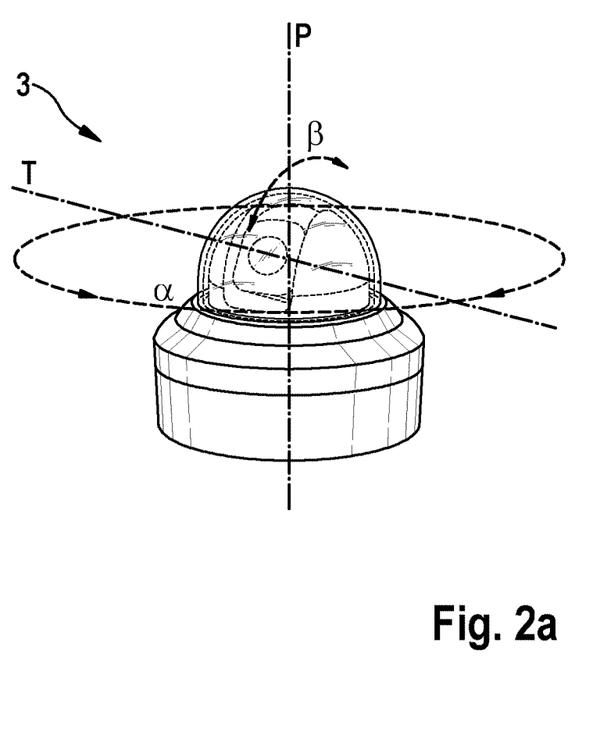
FIG. 2a shows the mobile receiver unit from FIG. 1 comprising the gyroscopic sensor as a first exemplary embodiment of the invention with an associated camera.
Figure 2B:
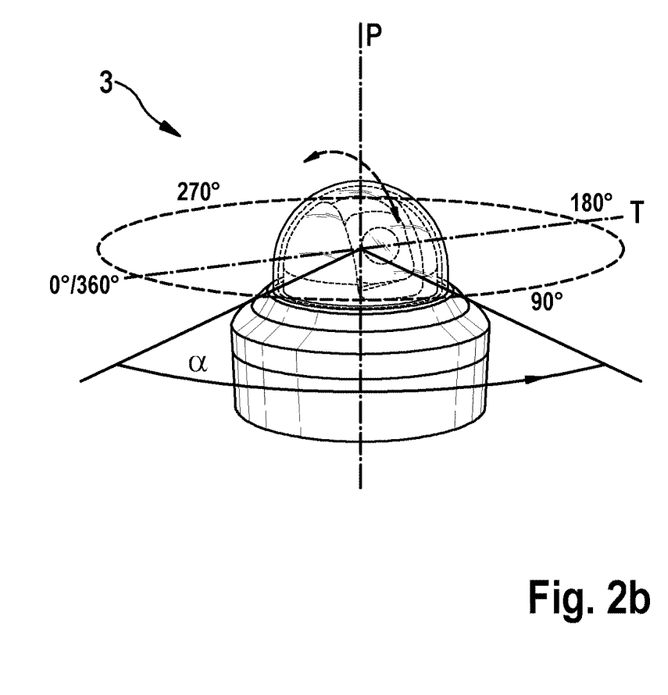
FIG. 2b shows the mobile receiver unit in a, in comparison to the mobile receiving unit from FIG. 2a, relative angle change around a pan axis.
Figure 2C:
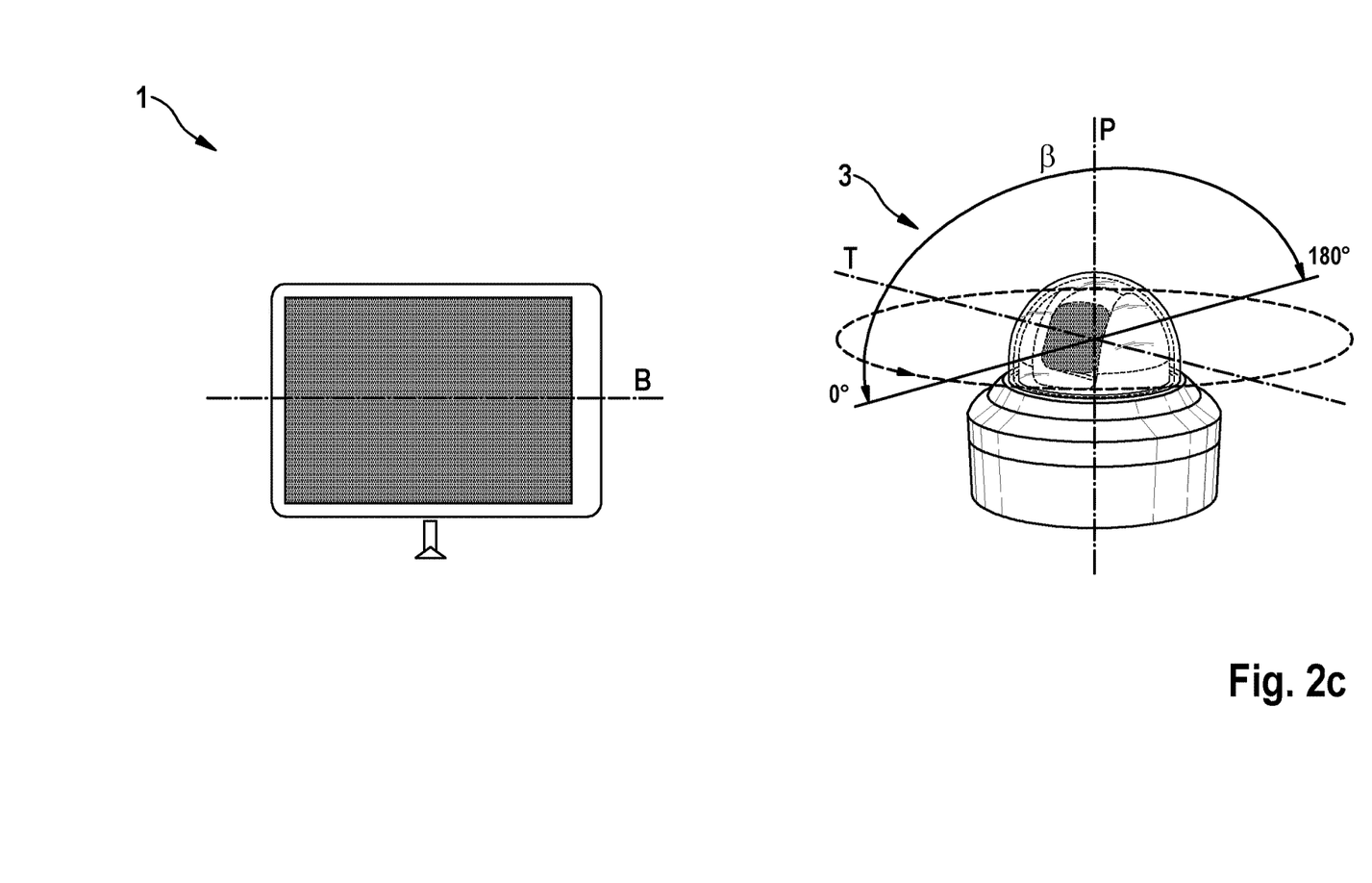
FIG. 2c shows the mobile receiver unit in a, in comparison to the mobile receiver unit from FIG. 2a, relative angle change around a tilt axis.

FIGS. 2a-2c show the mobile receiver unit 1 comprising the gyroscopic sensor 7 as a first exemplary embodiment of the invention and the camera 3 which can be controlled by the mobile receiver unit 1.

The mobile receiver unit 1 is located in the original state in FIG. 2a. In the original state, the mobile receiver unit is located in a horizontal relative position; however other relative positions are also possible as the original state. If the mobile receiver unit 1 is located in the original state, no relative change in angle of the mobile receiver unit 1 is present, so that a control command is not transmitted to the actuator 2.

The relative change in angle of the mobile receiver unit 1 is detected around a pan axis A and/or around a tilt axis B as the at least one axis. The pan axis A runs vertically and the tilt axis B horizontally. The relative change in angle of the mobile receiver unit 1 around the pan axis A determines a relative angle change of the pan angle α of the camera 3 around the pan axis P; and the relative change in angle of the mobile receiver unit 1 around the tilt axis B determines the relative angle change of the tilt angle β of the camera 3 around the tilt axis T.

FIG. 2b shows by way of example a possible relative change in angle of the mobile receiver unit 1 around the pan angle A. In this exemplary embodiment, the mobile receiver unit 1 is panned around the rotational axis of said mobile receiver unit 1, wherein the rotational axis extends as a perpendicular to the display screen surface of the display device 4. The pan axis A can alternatively be assumed to be formed by the user's own axis 9 or an axis parallel thereto or as a perpendicular axis in close proximity to the user's own axis 9. The perpendicular axis preferably extends through the gyroscopic sensor 7. In particular, the pan axis A is selected in such a way that, if the user 9 holds the mobile receiver unit 1 in front of himself/herself and rotates around his/her own axis (longitudinal axis), the pan angle α of the camera 3 is synchronously carried along. If the user 9 rotates to the left, the camera is panned to the left; if the user 9 rotates to the right, the camera 3 is then panned to the right. In the case of the user 9 rotating 360° around his/her own axis, the camera 3 is likewise panned around an angle of 360°.

The mobile receiver unit 1 was panned from the original state into a pan state as the target state around the pan axis A by 90°. By means of the relative change in angle of the mobile receiver unit 1 around the pan axis A, a relative angle change of the camera 3 from an original setting, as is shown in FIG. 2a, to a target setting, as is shown in FIG. 2b, took place around the pan axis P. The amount of the relative angle change of the pan angle α of the camera 3 is equivalent to the amount of the relative change in angle of the mobile receiver unit 1 around the pan angle A. As a result of the relative change in angle of 90° of the mobile receiver unit 1, a relative angle change of the camera 3 of 90° is therefore likewise present. As an alternative to the equivalent amount of the angle change, a scaling of the relative angle change of the camera 3 with respect to the mobile receiver unit 1 is also possible.

FIG. 2c shows by way of example a further possible relative change in angle of the mobile receiver unit 1 around the tilt axis B. The mobile receiver unit 1 was tilted from the original state into a tilt state as the target state around the tilt axis B about an angle of 180°. As a result of the relative change in angle of the mobile receiver unit 1 around the tilt axis B, a relative angle change of the camera 3 took place from the original state, as shown in FIG. 2a, to the target setting, as shown in FIG. 2c, around the tilt axis T. The amount of the relative angle change of the tilt angle β of the camera 3 is equivalent to the amount of the relative change in angle of the mobile receiver unit 1 around the tilt axis B. As a result of the relative change in angle of 180° of the mobile receiver unit 1, a relative angle change of the camera 3 likewise of 180° therefore occurs. The back side of the mobile receiver unit 1 to the front side shown in FIG. 2a is thus present. As an alternative to the equivalent amount of angle change, a scaling of the relative angle change of the camera with respect to the mobile receiver unit 1 is also possible.

Of course, a combined relative angle change of the pan angle α and the tilt angle β of the camera, as shown in FIGS. 2b and 2c is also possible. In this case, the relative change in angle of the mobile receiver unit 1 around the pan and tilt axis A, B is detected by means of the gyroscopic sensor 7. The pan and the tilt state jointly form the target state in this case.

Figure 3:
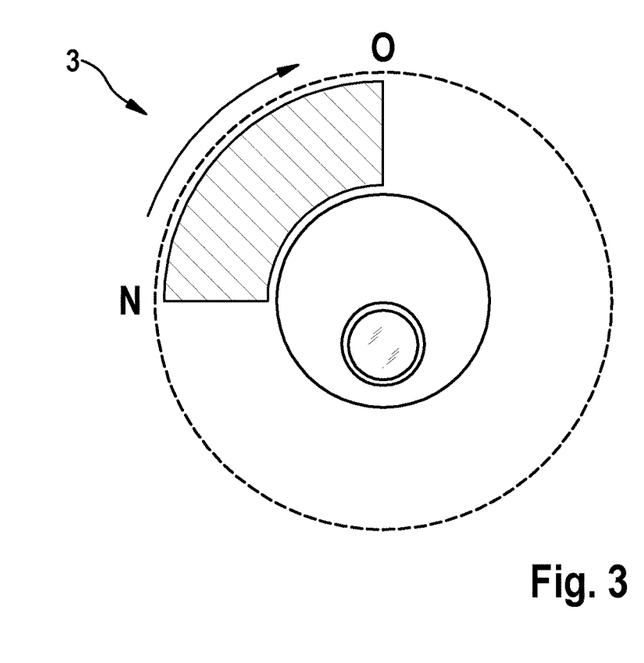
FIG. 3 shows the mobile receiver unit from FIG. 1 comprising the compass sensor as a second exemplary embodiment of the invention with the associated camera.

FIG. 3 shows the mobile receiver unit 1 comprising the compass sensor 8 as a second exemplary embodiment of the invention and the camera 3 which can be controlled by the mobile receiver unit 1. In contrast to the exemplary embodiment of FIGS. 2a to 2c, a relative measurement is not performed, i.e. there is no detection of the relative change in angle of the mobile receiver unit 1 from the original state to the target state, but there is an absolute measurement, namely the detection of the current orientation of the mobile receiver unit 1. The amount of the absolute angle setting of the pan angle α is equivalent to the amount of the absolute angle position of the mobile receiver unit 1. The camera 3 and the receiver unit 1 therefore always point in the same direction. A panning movement of the mobile receiver unit 1 occurred from north to east around the pan axis A, so that the camera 3 is also panned around the pan axis P from north to east.

A plurality of directions, namely north N, east E, south S and west W is displayed on the display device 6. The currently set orientation of the camera 3 is on the one hand displayed to the user in this manner, and, on the other hand, the orientation of the camera 3 is facilitated in accordance with the wishes of the user 9.

Figure 4:
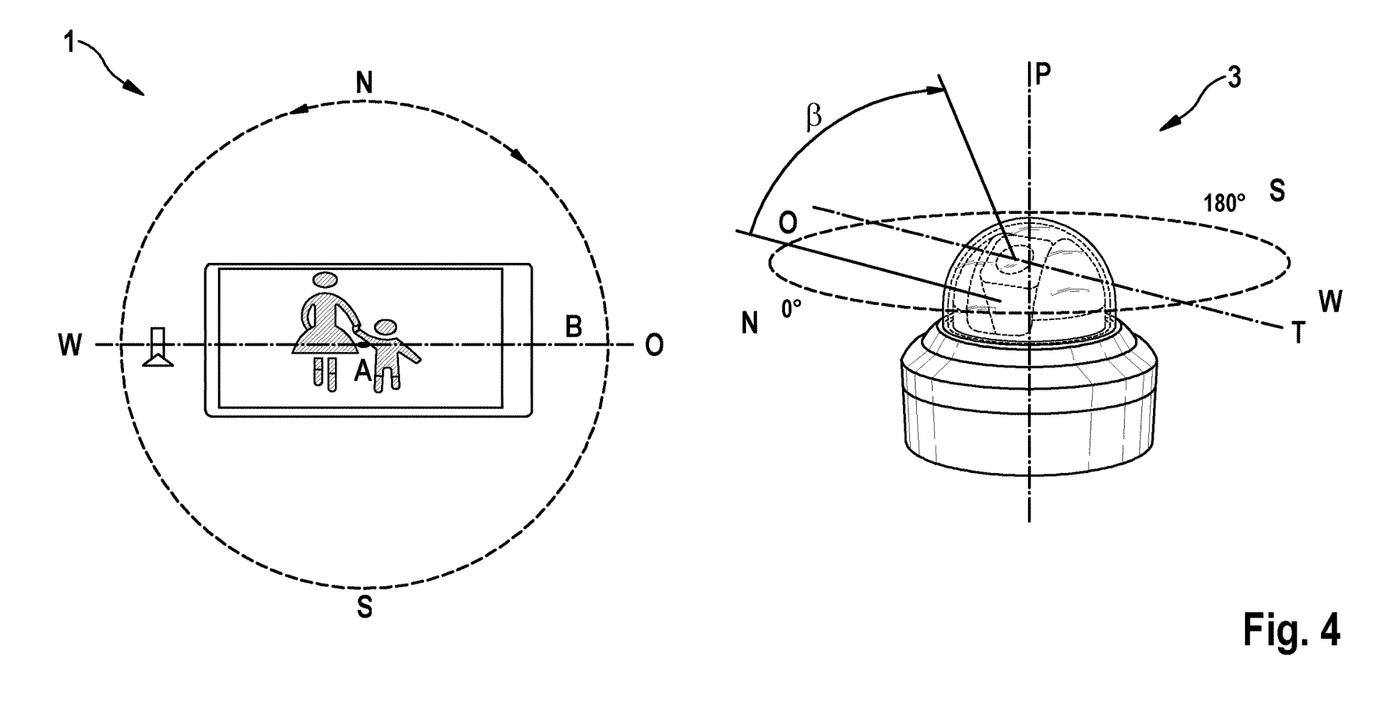
FIG. 4 shows the mobile receiver unit comprising the gyroscopic sensor and compass sensor from FIG. 1 as a third exemplary embodiment of the invention with the associated camera.

FIG. 4 shows the mobile receiver unit 1 comprising the gyroscopic and the compass sensor 7, 8 from FIG. 1 as a third exemplary embodiment of the invention with the associated camera 3.

The pan angle α of the camera 3 is set by detecting the absolute angle position α of the mobile receiver unit 1 using the compass sensor 8. The tilt angle β of the camera is set by detecting the relative angle change around the tilt axis B using the gyroscopic sensor 7. In FIG. 4, a tilting movement of the mobile receiver unit 1 around the tilt axis B about an angle of 45° is depicted, wherein the camera 3 was tilted by the equivalent amount of angle change around the tilt axis, likewise about an angle of 45°.

Provision can be made as an optional addition to the invention for the relative angle change around the pan axis A of the mobile receiver unit 1 to be detected parallel to the detection of the absolute angle position of said mobile receiver unit 1. By detecting a relative angle change, e.g. of 90°, and by detecting the absolute angle position, e.g. from north to east, a reliable outcome for the setting of the pan angle α of the camera 3 is achieved by correlating the detected results.

Figure 5:
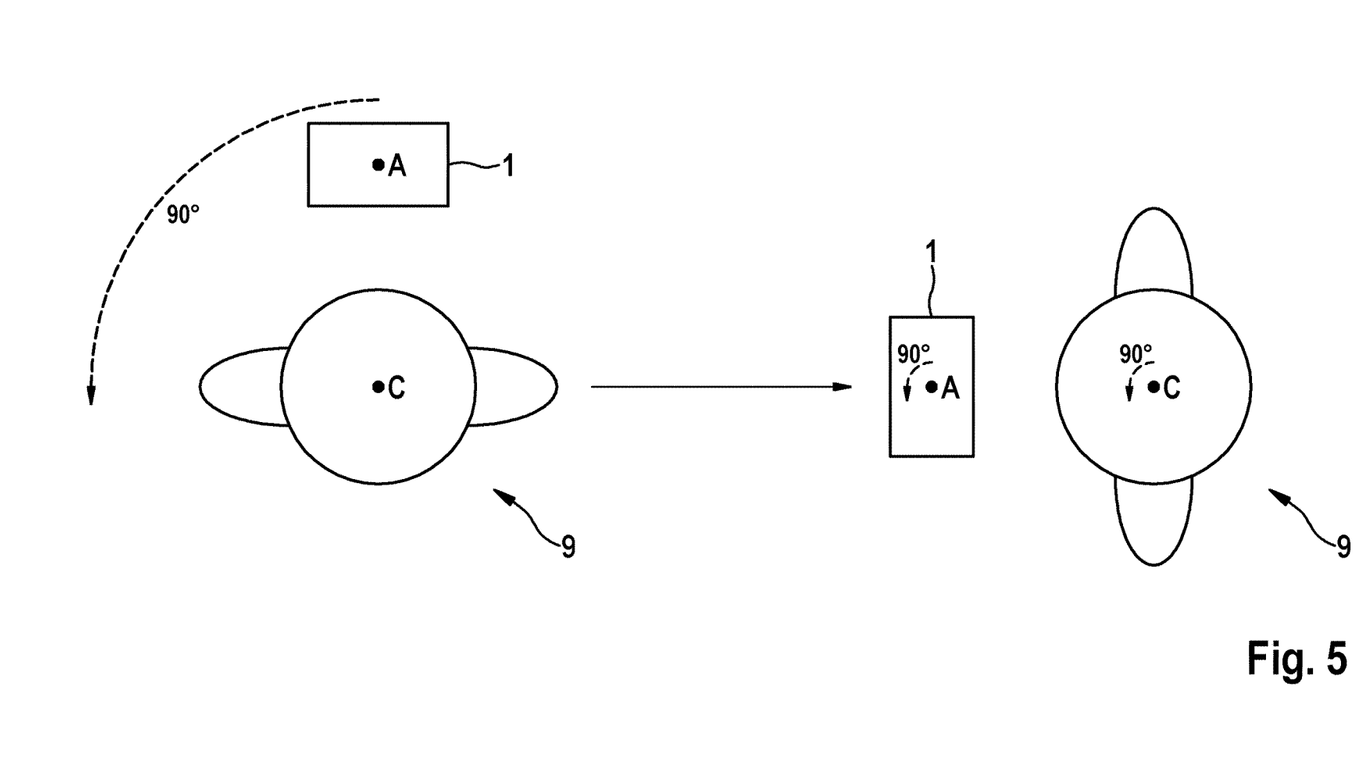
FIG. 5 shows a panning by the user with the mobile receiver unit from FIG. 1.

FIG. 5 shows a panning operation of the user 9 with the mobile receiver unit 1 from FIG. 1. The pan axis A of the mobile receiver unit 1 runs parallel to a user axis C of the user 9, wherein the user axis C of the user 9 is configured as a perpendicular axis. By way of example, a panning operation of the user 9 about an angle of 90° around the user axis C is depicted, wherein as a result of the user 9 panning about an angle of 90°, the mobile receiver unit 1 is likewise panned about an angle of 90° around the pan axis A.

The invention claimed is:

1. A mobile receiver unit for controlling an actuator for setting a pan angle, a tilt angle, or both the pan angle and the tilt angle of a camera, the mobile receiver unit comprising:
   a display device to display an image captured by the camera,
   a control device to define control commands for the actuator and
   a transmitter to transmit the control commands to the actuator,
   wherein the control device has a gyroscopic sensor to detect a relative change in angle of the mobile receiver unit around at least one axis, wherein a control command for a relative angle change of the pan angle, the tilt angle, or both the pan angle and the tilt angle of the camera is determined by the relative angle change, and/or
   the control device has a compass sensor to detect an absolute angle position of the mobile receiver unit around at least one axis, wherein a control command for an absolute angle setting of the pan angle of the camera is determined by the absolute angle position,
   wherein the mobile receiver unit is configured in such a manner that, in order to set the pan angle of the camera, the absolute angle setting of the pan angle takes place in a first step and the relative angle change of the pan angle takes place in a second or succeeding step.

2. The mobile receiver unit according to claim 1, wherein the relative change in angle of the mobile receiver unit is detected around a pan axis as the axis from an original state into a pan state and/or around a tilt axis as the axis from an original state into a tilt state, wherein the control command for the relative angle change of the pan angle of the camera is determined by the relative angle change of the mobile receiver unit around the pan axis and/or the control command for the relative angle change of the tilt angle of the camera is determined by the relative angle change of the mobile receiver unit around the tilt axis.

3. The mobile receiver unit according to claim 2, wherein the gyroscopic sensor comprises at least one first and one second gyroscopic sensor, wherein the first gyroscopic sensor is associated with the pan axis and the second gyroscopic sensor with the tilt axis.

4. The mobile receiver unit according to claim 2, wherein the amount of the relative angle change of the pan angle, the tilt angle, or both the pan angle and the tilt angle of the camera is equivalent to the amount of the relative angle change of the mobile receiver unit around the at least one axis.

5. The mobile receiver unit according to claim 1, wherein the amount of the absolute angle setting is equivalent to the amount of the absolute angle position.

6. The mobile receiver unit according to claim 1, wherein the absolute angle position is displayed on the display device.

7. The mobile receiver unit according to claim 1, wherein the mobile receiver unit comprises an operating device, wherein a zoom of the image can be controlled by means of the operating device.

8. The mobile receiver unit according to claim 1, wherein the mobile receiver unit is designed as a tablet or as a mobile telephone.

9. A method for operating a mobile receiver unit, wherein a pan angle, a tilt angle, or both the pan angle and the tilt angle of the camera are changed when a relative change in angle of the mobile receiver unit takes place around the at least one axis, and/or wherein the absolute angle setting of the pan angle of the camera is changed when the absolute angle position of the mobile receiver unit is changed,
   wherein the mobile receiver unit is configured in such a manner that, in order to set the pan angle of the camera, the absolute angle setting of the pan angle takes place in a first step and the relative angle change of the pan angle takes place in a second or succeeding step.

10. A non-transitory, computer-readable medium comprising instructions, when executed on a computer, to carry out the steps of the method according to claim 9.

11. A mobile receiver unit for controlling an actuator for setting a pan angle, a tilt angle, or both the pan angle and the tilt angle of a camera, the mobile receiver unit comprising:
    a display device to display an image captured by the camera,
    a control device to define control commands for the actuator and
    a transmitter to transmit the control commands to the actuator,
    wherein the control device has a gyroscopic sensor to detect a relative change in angle of the mobile receiver unit around at least one axis,
    wherein the control device has a compass sensor to detect an absolute angle position of the mobile receiver unit around at least one axis,
    wherein a control command for an absolute angle setting of the pan angle of the camera is determined by the absolute angle position, and
    wherein the mobile receiver unit is configured in such a manner that, in order to set the pan angle of the camera, the absolute angle setting of the pan angle takes place in a first step and the relative angle change of the pan angle takes place in a second or succeeding step.

* * * * *